United States Patent
Kawabe et al.

(10) Patent No.: US 7,088,696 B1
(45) Date of Patent: Aug. 8, 2006

(54) COMMUNICATION APPARATUS

(76) Inventors: Manabu Kawabe, c/o Hitachi, Ltd., Intellectual Property Group New Marunouchi Bldg. 5-1, Marunouchi 1-chome, Chiyoda-ku, Tokyo 100-8220 (JP); May Suzuki, c/o Hitachi, Ltd., Intellectual Property Group New Marunouchi Bldg. 5-1, Marunouchi 1-chome, Chiyoda-ku, Tokyo 100-8220 (JP); Seishi Hanaoka, c/o Hitachi, Ltd., Intellectual Property Group New Marunouchi Bldg. 5-1, Marunouchi 1-chome, Chiyoda-ku, Tokyo 100-8220 (JP); Nobukazu Doi, c/o Hitachi, Ltd., Intellectual Property Group New Marunouchi Bldg. 5-1, Marunouchi 1-chome, Chiyoda-ku, Tokyo 100-8220 (JP)

( * ) Notice: Subject to any disclaimer, the term of this patent is extended or adjusted under 35 U.S.C. 154(b) by 0 days.

(21) Appl. No.: 09/427,595

(22) Filed: Oct. 27, 1999

(30) Foreign Application Priority Data

Oct. 30, 1998 (JP) .......................................... 10-309851

(51) Int. Cl.
*H04B 7/216* (2006.01)

(52) U.S. Cl. ...................................... 370/335; 370/342
(58) Field of Classification Search ................ 370/335, 370/341, 342, 442, 458, 535, 395.7, 395.71, 370/395.72; 375/130

See application file for complete search history.

(56) References Cited

U.S. PATENT DOCUMENTS

| 5,303,226 | A | * | 4/1994 | Okanoue | 370/17 |
| 5,373,502 | A | * | 12/1994 | Turban | 370/18 |
| 5,541,926 | A | * | 7/1996 | Saito et al. | 370/474 |
| 5,615,227 | A | * | 3/1997 | Schumacher | 375/206 |
| 5,682,403 | A | * | 10/1997 | Tu | 375/200 |
| 5,757,846 | A | * | 5/1998 | Vasudevan | 375/200 |
| 5,805,583 | A | * | 9/1998 | Rakib | 370/342 |
| 5,894,473 | A | * | 4/1999 | Dent | 370/342 |
| 5,903,550 | A | * | 5/1999 | Spock | 370/335 |
| 6,122,311 | A | * | 9/2000 | Watanabe | 375/147 |
| 6,151,336 | A | * | 11/2000 | Cheng | 370/535 |
| 6,195,343 | B1 | * | 2/2001 | Watanabe | 370/335 |
| 6,330,233 | B1 | * | 12/2001 | Miya | 370/342 |
| ,064,142 | A1 | * | 5/2002 | Antonio | 370/335 |
| 2002/0064142 | A1 | * | 5/2002 | Antonio | 370/335 |

FOREIGN PATENT DOCUMENTS

WO   WO 95/33350   12/1995

* cited by examiner

*Primary Examiner*—Chirag Shah

(57) ABSTRACT

The hardware configuration of a baseband block in a radio communication system is reduced in gate size. Modulation/demodulation processing in a baseband block is divided into a plurality of processing units, which are connected to one another by buffer memories. The hardware gate sizes are reduced by performing processing on a plurality of channels by time division multiplexing at a speed higher than the speed at which received signals are written into the buffer memories.

7 Claims, 12 Drawing Sheets

COMMUNICATION APPARATUS

BACKGROUND OF THE INVENTION

1. Field of the Invention

The present invention relates to hardware and software configurations of communication apparatuses (at the base station and terminals) for processing data communicated over a plurality of channels. It is particularly suitable for communication apparatuses for use in mobile communication systems using code division multiple access (CDMA).

2. Description of the Related Art

The configuration of a base station for use in CDMA mobile communication systems according to the prior art is shown in FIG. 12.

Received signals of a carrier frequency band received from an antenna 100 are converted into received baseband signals by a radio frequency block 101, and inputted to a baseband block 134. Baseband transmitted signals of different channels outputted from the baseband block 134 are superposed by an output multiplexer 107, converted by a radio frequency block 101 into transmitted signals of the carrier frequency band, and transmitted from the antenna 100.

The baseband block 134 is equipped with as many modulator/demodulators 102–104, each for processing transmission and reception over one channel, as the channels used by the base station. A matched filter (MF) 135 and a peak detector 136 are jointly provided for a plurality of channels, and intermittently perform path searching for each of the channels. Each peak detector 136 selects the higher peaks of correlation values outputted from an MF (indicating the multi-path reception timing). The selected path timing is set in n correlators such as correlators 108–110 (n is the number of fingers) of one of the modulator/demodulators 102–104 for the corresponding channel to undergo despreading on a finger-by-finger basis.

By executing path search for each channel at the base station periodically on a time division basis in this way and providing one MF jointly for a plurality of channels, the gate size of hardware is reduced. However, in this configuration, a modulator/demodulator 102 is provided for each channel.

Also, as a communication mode in mobile communication systems, there is the multi-code transmission mode which realizes transmission at high overall speed by multiplex transmission of data to be transmitted using a plurality of low-speed transmission channels. Where a mobile station is to support this multi-code transmission mode, its baseband block is required to have number of modulator/demodulators corresponding to a plurality of channels as in the base station shown in FIG. 12.

BRIEF SUMMARY OF THE INVENTION

Thus the baseband block 134 in a conventional communication apparatus has as many modulator/demodulators 102–104 as the number of channels, and these modulator/demodulators perform processing in parallel. Accordingly, there is the problem of an increase in hardware gate size, in proportion to the number of channels to be accommodated for a base station, and to the speed of multi-code transmission for a mobile station.

On the other hand, while the processing speed of LSIs has reached such a high level as 256 MHz in recent years, the data rate of transmission and reception over a radio channel is only about 4 MHz, though it varies with the system of communication. Therefore, even if the processing speed of the baseband block 134 is enhanced, the baseband block is eventually limited by the data rate, and cannot fully utilize its processing capacity.

Furthermore, blocks constituting the modulator/demodulators 102–104 include blocks to execute processing on a symbol-cycle basis (correlators 108 and the like), blocks to execute processing on a slot-cycle basis (detectors 111 and the like) and blocks to execute processing on a frame-cycle basis (de-interleavers 115, error detecting decoders 116 and the like). However, in the modulator/demodulators 102–104 these blocks are connected serially, and processing steps differing in the unit of processing are consecutively executed in a time series. As a consequence, blocks processing in large units have to wait for the completion of processing by blocks processing in smaller units, resulting in idle time for blocks processing in large units during which no processing can be accomplished.

In order to solve the above-stated problems, processing on a plurality of channels is accomplished by time division multiplexing by a signal processing apparatus provided with storage means for storing input signals on a plurality of channels and processors needed for modulation/demodulation, to read data out of the storage means at a higher speed than data are inputted to the storage means and processing at high speed. Processing on a plurality of channels by time division multiplexing makes it possible to reduce the hardware gate size substantially.

DESCRIPTION OF THE PREFERRED EMBODIMENTS

Figure 11:
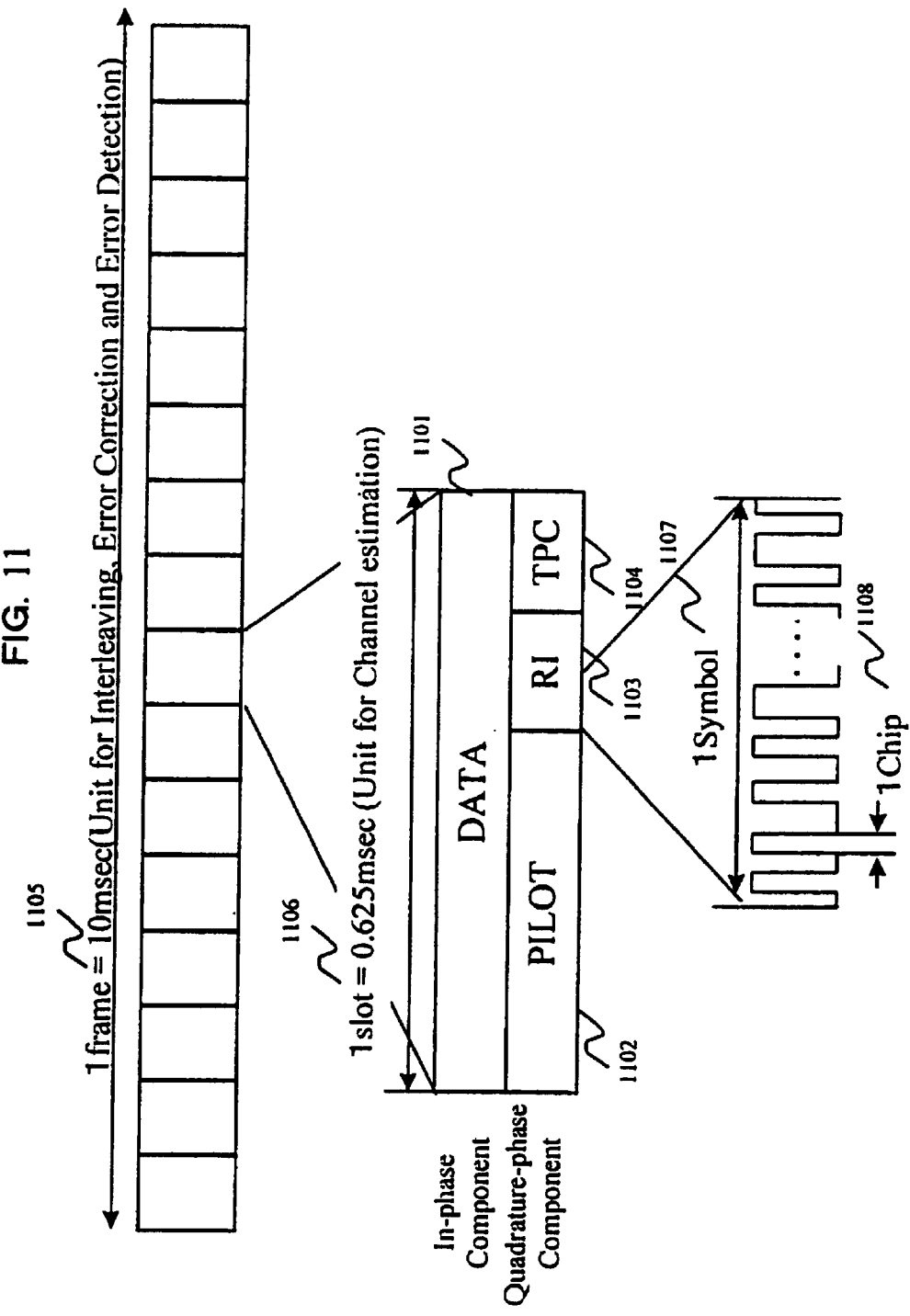
FIG. 11 illustrates the relationship between the frame and slot formats in a W-CDMA system.
Figure 12:
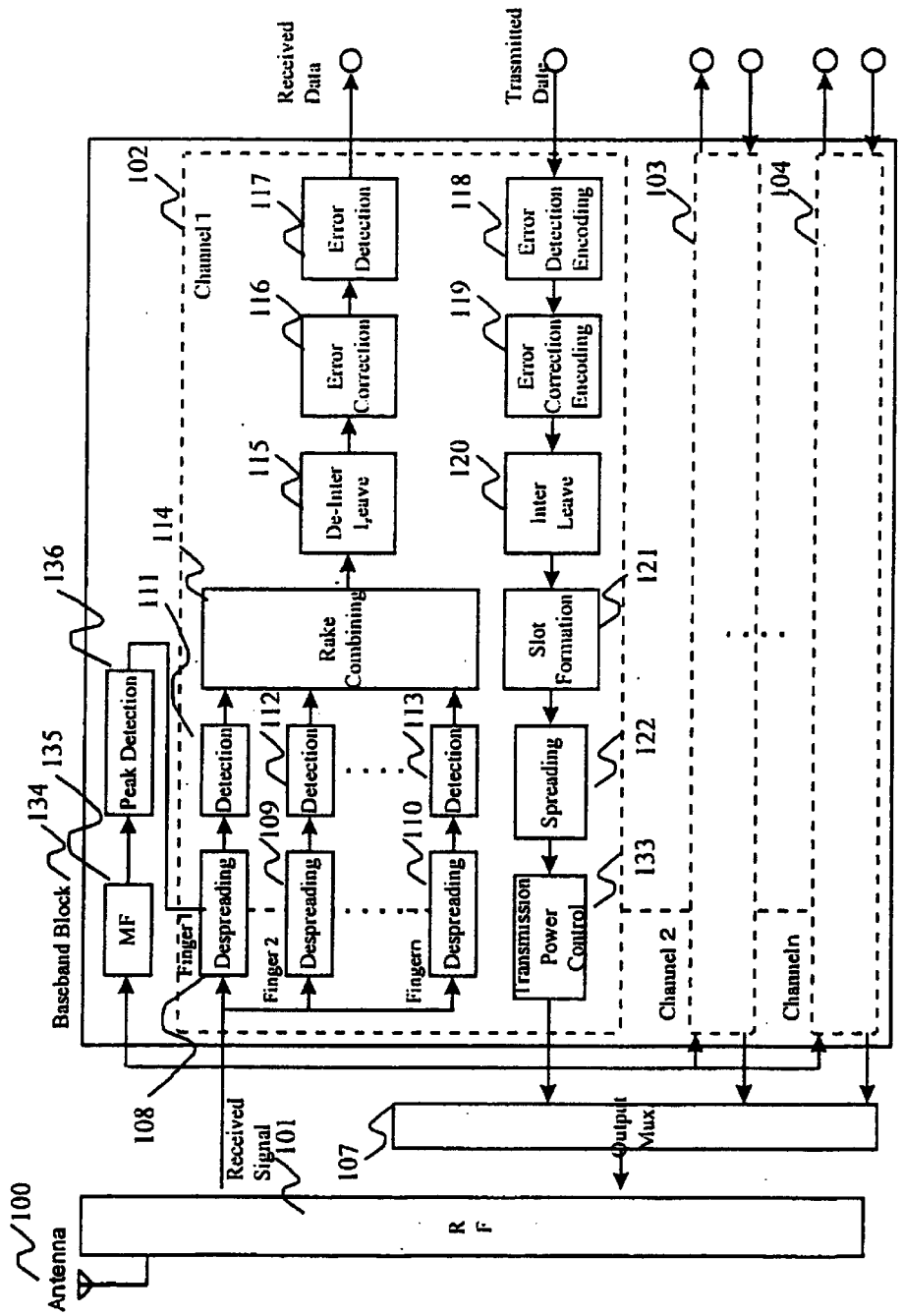
FIG. 12 illustrates the configuration of a base station according to the prior art.

FIG. 11 illustrates the communication format on an uplink for transmission from a mobile station to the base station in a W-CDMA system. One frame 1105 (=10 msec) is the basic unit of channel CODEC processing such as interleaving, error correction encoding and the like. Each frame is divided into 16 slots. One slot 1106 (=0.625 msec) is the basic unit of air interface control including channel estimation, transmission power control and the like. Each slot is divided into an in-phase (I) component and quadrature (Q) components; the I component carries data symbols 1101, and the Q components carry control symbols including pilot symbols 1102. One symbol 1107 is the basic unit of transmitted data after channel CODEC processing. In the CDMA system, a spread spectrum is achieved by multiplying this symbol by spreading codes (pseudo random codes) known as PN sequence. One chip 1108 is the basic unit of pseudo random codes and the smallest unit in the whole system of processing.

(Embodiment 1)

Figure 1:
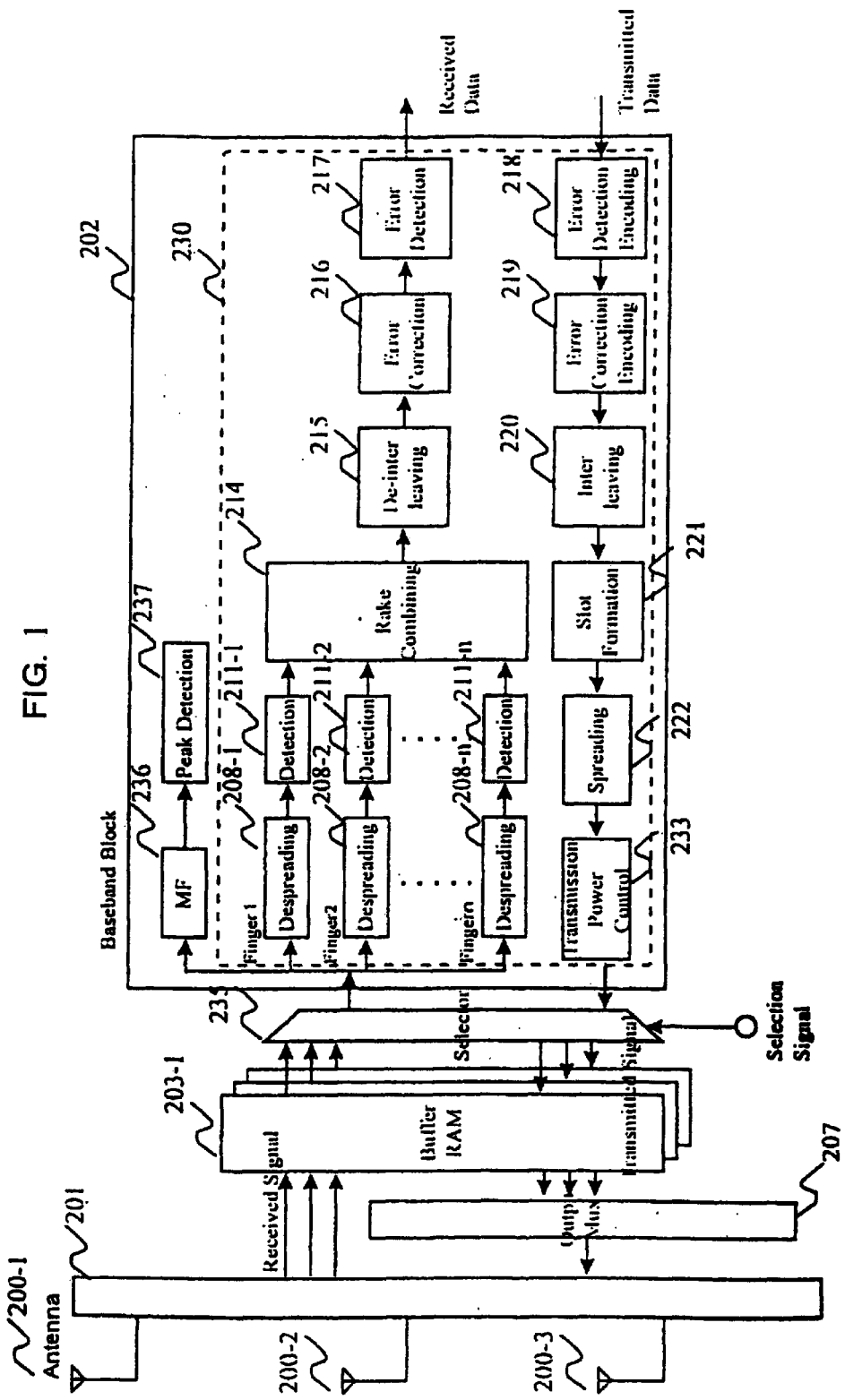
FIG. 1 illustrates the configuration of the baseband block in the first mode of implementation.

FIG. 1 illustrates a first mode of carrying out the invention. An example having three antennas 200-1~3 is shown. A base station or a mobile station performing space diversity or a multi-sector base station has a plurality of antennas. Space diversity compensates for deterioration of received signals due to fading by simultaneously receiving signals coming from the same mobile station (or base station) with a plurality of antennas. Multi-sectoral arrangement, on the other hand, is intended to enhance the efficiency of frequency use by dividing the service area (cell) of the base station into a plurality of sectors each having antennas for transmission and reception, using spreading codes differing from sector to sector, and thereby increasing the number of channels the base station can accommodate. In either case, since a plurality of received signals are inputted to the baseband block 202, it is required to switch the input with a selector 235 at every time of processing depending on the sector of the service area the channel (mobile station) for which modulation or demodulation is to be performed belongs to, or the diversity antenna (mobile station) for which modulation or demodulation is to be accomplished. FIG. 1 discloses the configuration of a base station in a multi-sector arrangement.

A received signal of the carrier frequency band received by each of the antennas 200-1~3 is converted by the radio frequency block 201 into a baseband received signal. The baseband received signal is stored into buffer memories 203-1~3 provided for each antenna. These buffer memories may be configured as a plurality of memories or as a plurality of areas in one memory.

Each of the buffer memories 203-1~3 is enabled to store a quantity of data several times greater than the largest unit of modulation/demodulation processing (one frame in the W-CDMA system for instance). The capacities of the buffer memories are appropriately determined according to the difference between the data rate of the radio channels and the processing speed of the baseband block 202, and to the number of channels for which the modulation/demodulator 230 performs multiplexing. Further, the number of channels for which one baseband block can perform multiplexing is not more than the processing speed of the baseband block divided by the data rate of the radio channels.

In the baseband received signals stored in the buffer memories 203-1~3, data of all the channels of all the mobile stations in the service area of the pertinent sector are multiplexed. By reading them repeatedly into a modulator/demodulator 230 to demodulate them, the hardware gate size can be reduced and, at the same time, the processing speed of LSIs can be well utilized in demodulation processing. Further, the modulator/demodulator 230 repeatedly modulates transmitted data, and the baseband transmitted signals that are generated are stored into the buffer memories 203-1~3 on a sector-by-sector basis. When the baseband transmitted signals of all the channels multiplexed within the LSIs sector by sector are stored into the buffer memories 203-1~3, these baseband transmitted signals are multiplexed by an output multiplexer 207 with respect to transmitted signals of all the LSIs at the base station. The baseband transmitted signals that have been multiplexed are converted by the radio frequency block 201 into transmitted signals of the carrier frequency band, and transmitted from the antenna 200. In this manner, the hardware gate size can be reduced and, at the same time, the processing speed of LSIs can be well utilized in demodulation processing.

The actions of the baseband block 202 of FIG. 1 will be described below.

A control block (not shown in FIG. 1) exercises control over the whole baseband block 202. The items of control include the designation of channels, sectors of transmission/reception and antennas subject to modulation/demodulation processing.

(1) Demodulation processing

Since received signals are usually oversampled, the signals are inputted and stored into the buffer memories 203-1~3 at a speed several times higher than the chip speed. When received signals have been written to the prescribed capacity of the buffer memories, the process returns to the initial address, and they are overwritten. In the case of fourfold sampling in the W-CDMA system (at a chip speed of 4 MHz), the data rate of input to the buffer memories 203-1~3 is 16 MHz. The demodulation processing of received signals stored into the buffer memories 203-1~3 is at the processing speed (e.g. 256 MHz) of the baseband block 202.

A selector 235 designates a buffer memory 203 corresponding to the receiving antenna 200 for the sector to which the channel subject to intended demodulation belongs, and inputs received signals to a MF 236 and the modulator/demodulator 230.

As path searching is done by the MF 236 and a peak detector 237, the reception timing of the signal is given to correlators 208-1~n. The correlators 208-1~n multiply received signals (spread spectrum signals) and the spreading codes of channels chip by chip at a given reception timing, and accumulate the products of multiplication symbol by symbol (correlating). Detectors 211-1~n detect phase rotation that may have occurred on the propagation path calculated from pilot signals contained in received signals, coordinate the phase of despread multi-path received signals (outputs of correlators 208), and input them to a rake combiner 214. This detection of phase rotation by the detectors 211 is done on a slot-cycle basis. The rake combiner 214 combine in-phase multi-path received signals. In the case of a base station performing space diversity, the rake combiner 214 carries out not only rake combination of multi-path received signals but also diversity combination to combine received signals from a plurality of antennas.

The rake-combined received signals are successively handed over to a de-interleaver 215, an error correction decoder 216 and an error detection decoder 217 and undergo demodulation processing. These are intended to decode signals which have been transmitted after encoding and interleaving. The encoding and interleaving of data were accomplished on a frame-cycle basis, and decoding is also done on a frame-cycle basis. Signals having undergone error correction are outputted as received data.

(2) Modulation processing

First, one frame of transmitted data are inputted to the error correction encoder 218. The error correction encoder 218 generates a CRC (cyclic redundancy check) code for this one frame of transmitted data. The transmitted data to which the error correction code has been appended are inputted to an error correction encoder 219. The error correction encoder 219 generates error correction codes including a convolutional code and a turbo code for the inputted data. The transmitted data to which the error correction codes have been appended are inputted to an interleaver 220. The interleaving is intended to reduce the impact of burst errors occurring on the propagation path by rearranging the sequence of the transmitted data for further transmission.

A transmission format generator 221 assigns a pilot symbol and a transmission power control signal to the interleaved transmitted signals on a slot-cycle basis in accordance with a prescribed format (see FIG. 11). A spreader 222 multiplies the transmitted signals and a spreading code to carry out spread modulation. A transmission power controller 223 performs transmission power control on the basis of transmission power control information that has been received. More specifically, since the total power that can be transmitted by the antenna 200 is constant, the ratio of transmitted signals on each channel in the total power is assigned. Finally, transmitted signals on each channel are stored into the buffer memories 203-1~3.

(Embodiment 2)

Figure 2:
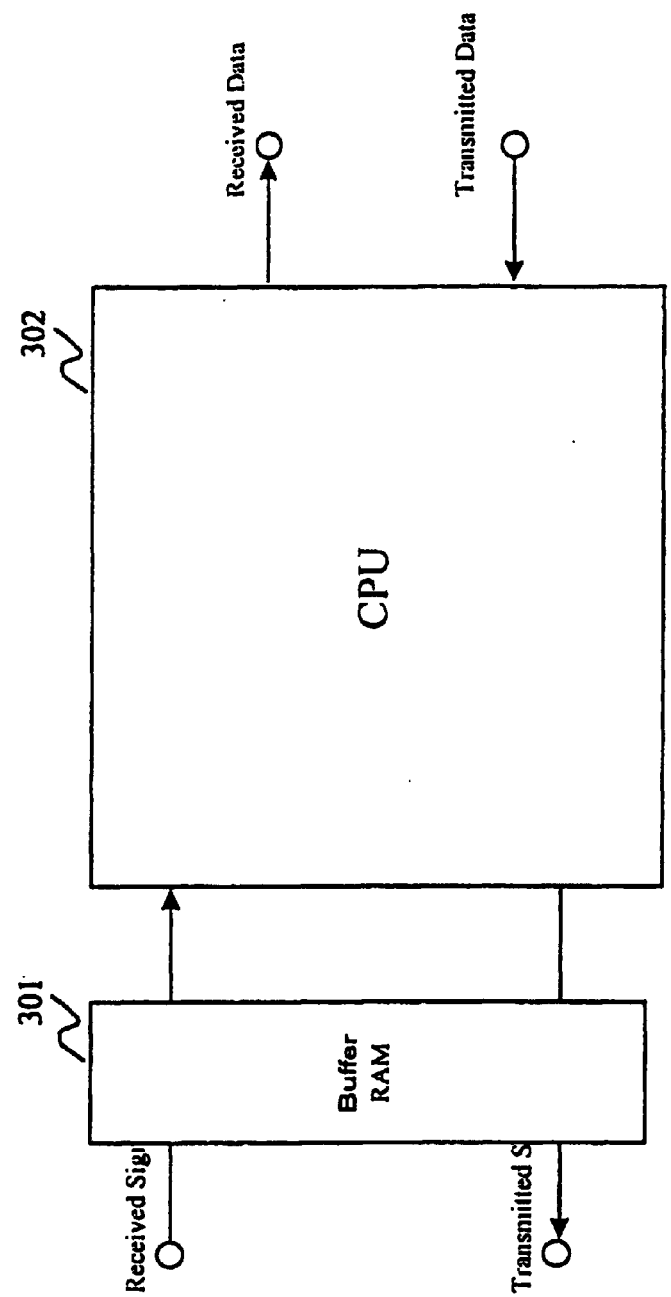
FIG. 2 illustrates the configuration of the baseband block in the second mode of implementation.

FIG. 2 illustrates a second mode of carrying out the present invention. FIG. 2 shows only the baseband block. While the processing after correlating is realized by wired logic in the first mode of implementation, this second mode of implementation is characterized by its execution by a CPU 302 using software. Moreover, although this example is simplified into a single-antenna disposition, where a plurality of antennas are involved, a plurality of buffer memories 301 can be provided to input and output transmitted/received signals to and from the CPU 302 by switching from one to the other of the buffer memories. Processing done on baseband signals mainly consists of multiplication and addition. Therefore, by programming these procedures into software and having them carried out commonly on the hardware of CPU 302, the hardware gate size can be reduced.

Figure 3:
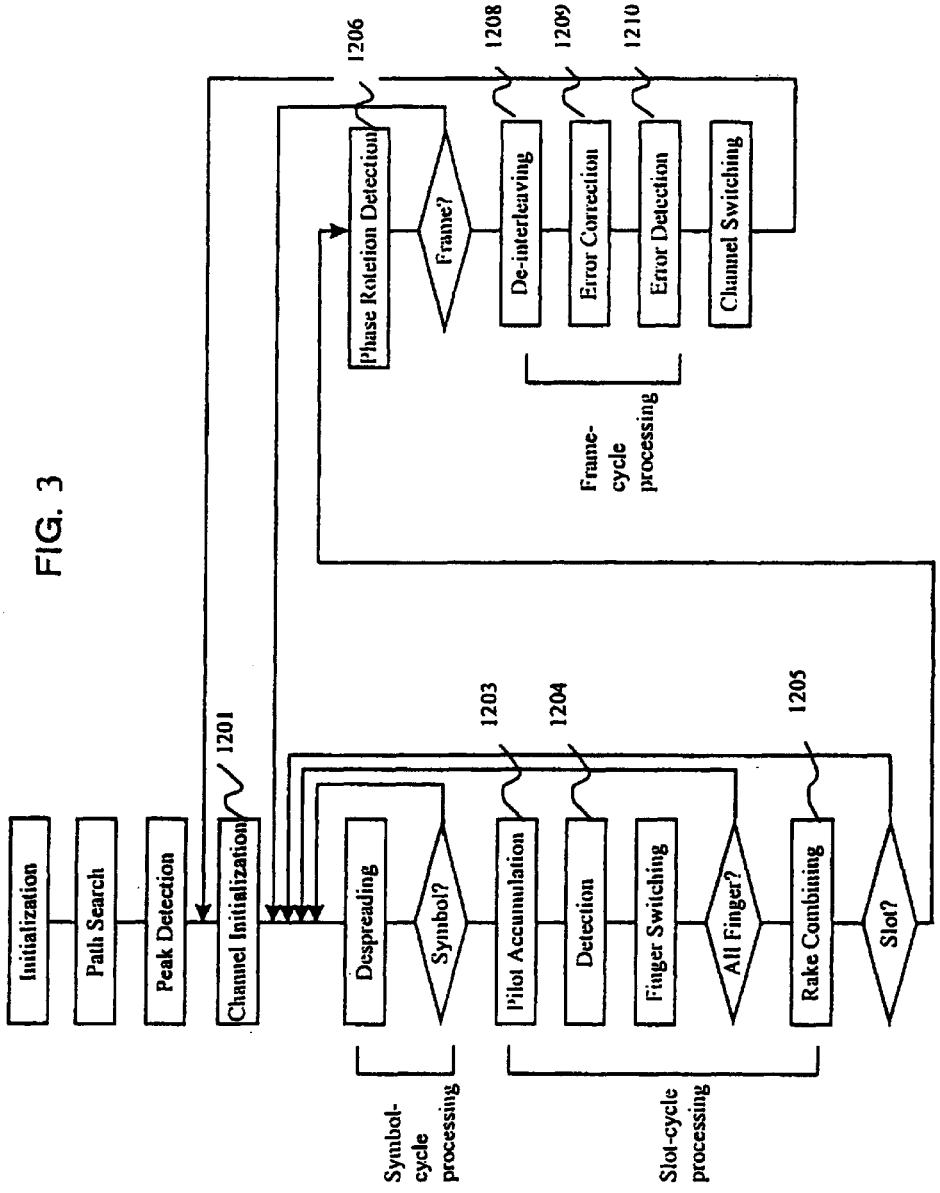
FIG. 3 shows a flowchart of demodulation in the second mode of implementation.

FIG. 3 shows a flowchart of demodulation processing. First, at the time of start of communication, each channel is path-searched for peak detection, and the reception timing of each finger is determined. Next, channels are initialized (step 1201). The initialization involves the setting of a spreading code, spreading factor and timing of reception by path searching. Symbol-cycle processing 1202 corresponds to processing by the correlators 208 in FIG. 1. Slot-cycle processing 1203 to 1206 corresponds to the processing by the detectors 211 and the rake combiner 214 in FIG. 1. Frame-cycle processing 1208 to 1210 corresponds to the frame-cycle processing block 215 to 217 in FIG. 1. After going through these steps of processing in succession, the channel is switched to another and the above-described processing sequence is repeated to complete processing for a plurality of channels.

Figure 4:
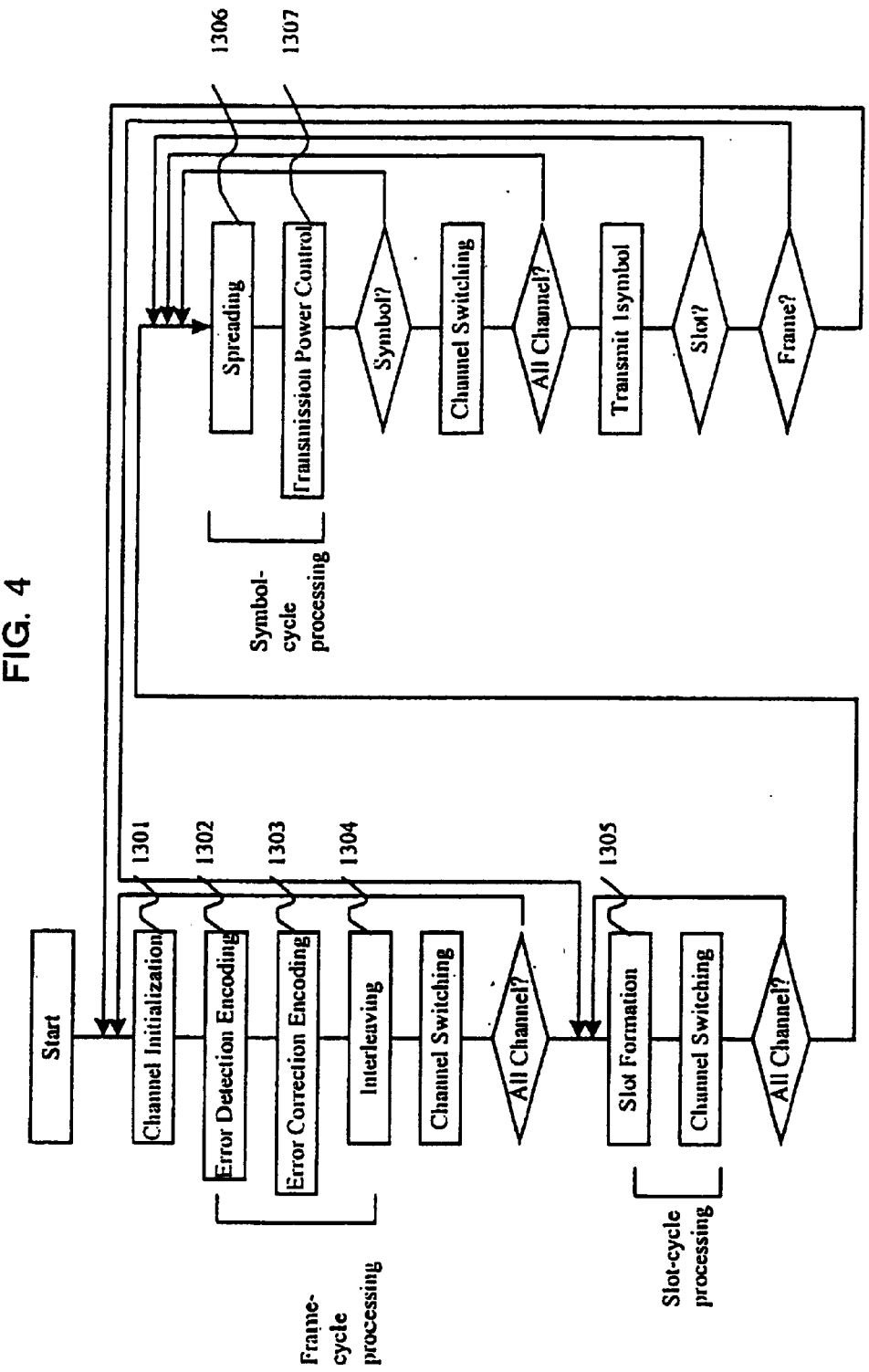
FIG. 4 shows a flowchart of modulation in the second mode of implementation.

FIG. 4 shows a flowchart of modulation processing. In the transmission system, frame-cycle processing 1301~1304 is repeated for one frame for every channel. The frame-cycle processing corresponds to processing by the frame-cycle processing block 218 to 220 in FIG. 1. After that, slot-cycle processing 1305 is carried out for every channel. The slot-cycle processing 1305 corresponds to processing by the transmission format generator 221 in FIG. 1. After that, spreading and transmission output multiplexing are accomplished by symbol-cycle processing 1306 and 1307. This processing corresponds to processing by the spreader 222 and the transmission power controller 233 in FIG. 1. For one symbol, the outputs on all the channels are multiplexed and transmitted (step 1308). When processing of data for one frame on all the channels is completed, the process returns to the start of the flow.

(Embodiment 3)

Figure 5:
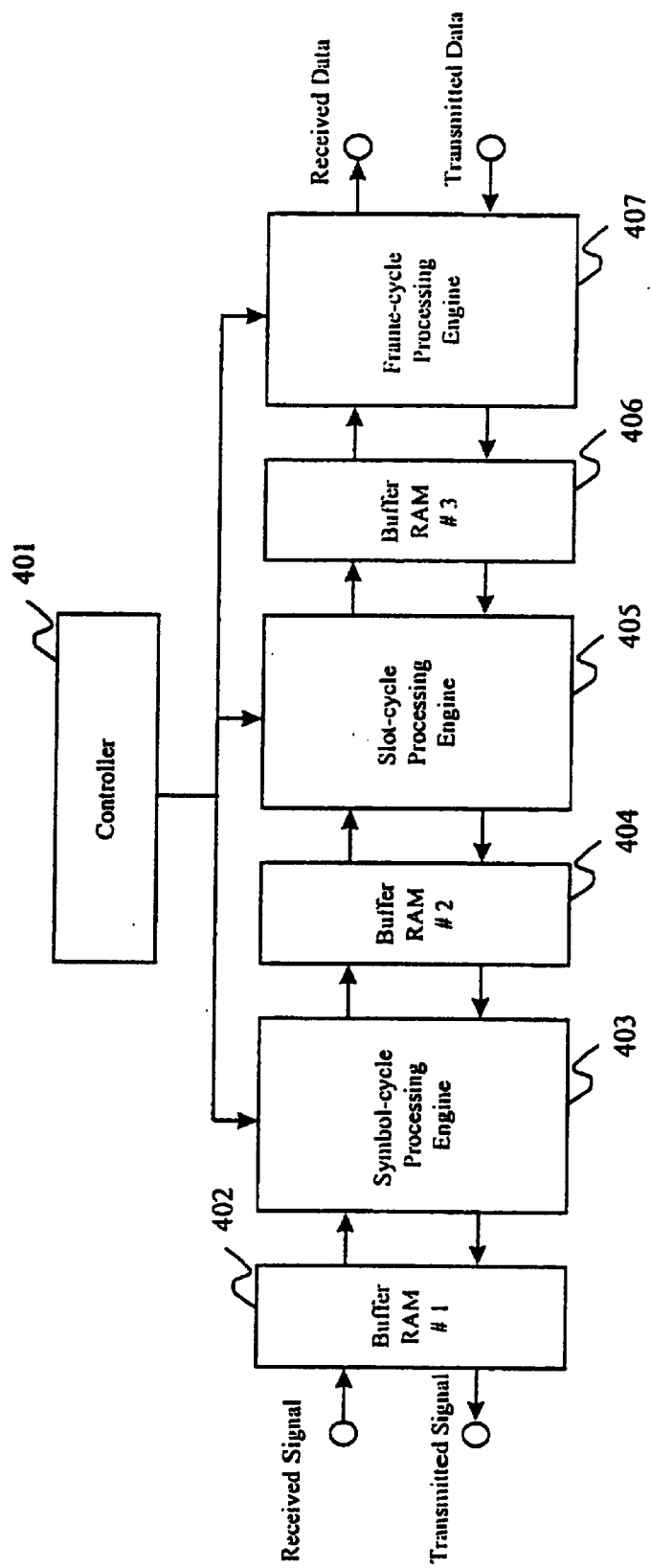
FIG. 5 shows a flowchart of demodulation in the third mode of implementation.

FIG. 5 illustrates a third mode of carrying out the present invention. FIG. 5 also shows only the baseband block, and a single-antenna disposition is illustrated for the sake of simplification. The third mode of implementation is characterized by the successive appearance of symbol-cycle processing, slot-cycle processing and frame-cycle processing in modulation/demodulation processing. The description will also refer to FIG. 1.

Received signals are inputted in a chip cycle to the correlators 208, which output received data after despreading in a symbol cycle. On the other hand, the detectors 211 and the rake combiner 214 process one slot of received data (outputs of the correlators 208). Furthermore, the de-interleaver 215, the error correction decoder 216 and the error correction decoder 217 process one frame of received data (output of the rake combiner 214).

Similarly, the error correction encoder 218, the error correction encoder 219 and the interleaver 220 perform frame-cycle processing, the transmission format generator 221 performs slot-cycle processing, and the spreader 222 and the transmission power controller 233 perform symbol-cycle processing.

In this embodiment, division into blocks required for modulation/demodulation processing is based on the cycle of processing, and each processing block is configured to be able to operate independently of one another. If processing steps of different cycles are carried out consecutively as shown in FIG. 1, the speed of symbol-cycle processing determines the overall processing speed, while the hardware for larger processing cycles, such as slot and frame cycles, is utilized only inefficiently. For this reason, each block consists of processing steps of the same processing cycle in this embodiment. And the overall efficiency of hardware use is enhanced by appropriately setting the operating speed of each block or the number of blocks in parallel. For instance, a plurality of symbol-cycle processing engines 403 are provided in parallel. Or slot-cycle processing engines 405 are operated faster than frame-cycle processing engines 407.

Baseband received signals are stored into a first buffer memory 402 for several symbols, which is several times larger than the processing unit of the symbol-cycle processing engines 403. To fix the timing to switch processing, it is so arranged that, even if the length of a symbol differs between channels, a constant quantity of received signals be inputted to the baseband block 202. For instance, where the unit of processing is set to the symbol length of the channel which has of the longest symbol cycle the channel is switched for processing at every one symbol at the minimum (where the symbol cycle is the longest), and every 16 symbols at the maximum(where the symbol cycle is the shortest, both in the case of W-CDMA).

The symbol-cycle processing engines 403 constitute a block to perform symbol-cycle modulation/demodulation processing. The symbol-cycle processing engines 403 input from and output to the slot-cycle processing engines 405 via second buffer memories 404. The second buffer memories 404 store data equivalent to several slots, several times the units of processing by the slot-cycle processing engines 405 to prevent pre-processing received signals from being overwritten. A second buffer memory 404 is provided for every channel.

The slot-cycle processing engines 405 constitute a block to perform slot-cycle modulation/demodulation processing. The slot-cycle processing engines 405 input from and output to the frame-cycle processing engines 407 via third buffer memories 406. The third buffer memory 406, is also provided for each channel, and stores received data equivalent to several frames.

The frame-cycle processing engines 407 constitute a block to perform frame-cycle modulation/demodulation processing. Incidentally, even where processing in a longer cycle than one frame is required for interleaving or any other purpose, processing is similarly accomplished with frame-cycle processing engines.

Each engine is controlled by a control engine 401. Under the control of the control engine 401, each of the engines 403, 405 and 407 carry out modulation/demodulation processing asynchronously, and the channels under processing are also independent for each engine. This disposition enables modulation/demodulation processing for a plurality of channels to be accomplished by time division multiplexing at a high processing efficiency for the whole hardware.

(1) Symbol-cycle Processing Engines 403

Figure 6:
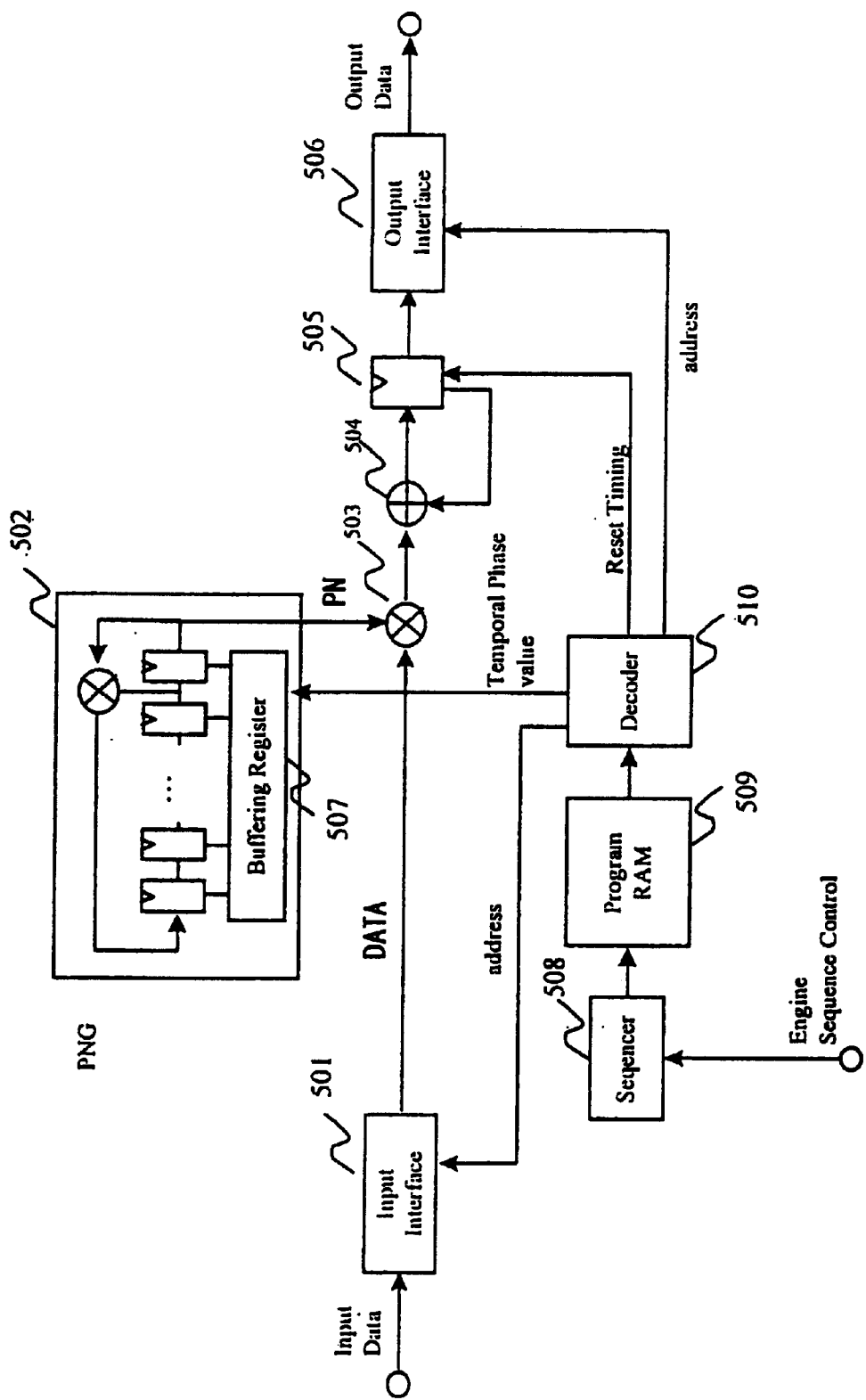
FIG. 6 shows a configuration of the receiving system of a symbol-cycle processing engine in the third mode of implementation.

FIG. 6 illustrates the configuration of the receiving (demodulation) unit of a symbol-cycle processing engine 403. A symbol-cycle processing engine has processing elements including an exclusive-OR processor 503 and an adder 504, and performs demodulation processing with one symbol as its smallest processing unit. It reads in chip-by-chip data from the first buffer memory 402 via an input interface 501. The exclusive-OR processor 503 executes exclusive-OR processing with a spreading code generated by a PN (spreading code) generator 502, and the adder 504 and a register 505 accumulate the results of processing for one symbol. The results of accumulation are written into the second buffer memory 404 via an output interface 506.

An operational command to the receiving unit of a symbol-cycle processing engine is given as a sequencer 508 reads a control command out of a program memory 509 and a decoder 510 decodes that command. Necessary commands include a command to start/stop demodulation processing of received signals on one channel, designation of a read/write address for the input/output interfaces 501 and 506, setting of the state value for the internal register 507 in the PN generator 502, and designation of reset timing for the accumulating register 505.

The symbol-cycle processing engines shown in FIG. 6 serve as correlators by fixing the phase of the spreading code generated by the PN generator 502 relative to the inputted data. On the other hand, by sliding the phase of the spreading code generated by the PN generator 502, they serve as sliding correlators (matched filters). This switching in function is accomplished by an operational command from the sequencer 508. Incidentally, when they serve as sliding correlators, the peak timing is detected by the slot-cycle engines of the next stage.

In the program memory 509 is stored a program for a plurality of channels (e.g. designation of the spreading factor of channels, the state of the internal register in the PN generator). Therefore, for the receiving unit of FIG. 6, the channels allowing demodulation processing are flexible. Further, because the read address for the input interface 501 can be designated by a program, fingers allowing demodulation processing are also flexible. Accordingly the overall hardware efficiency can be enhanced by having the receiving unit of the symbol-cycle processing engines operated faster than other processing engines and carrying out time division multiplexing with the channel fingers subject to demodulation processing appropriately designated.

Furthermore, the receiving unit of the symbol-cycle processing engine is subject to the heaviest processing load because it processes signals of the chip rate or the sampling rate. Therefore it is desirable for the purpose of enhancing the overall hardware efficiency to provide a plurality of receiving units and have them perform processing in parallel.

Figure 7:
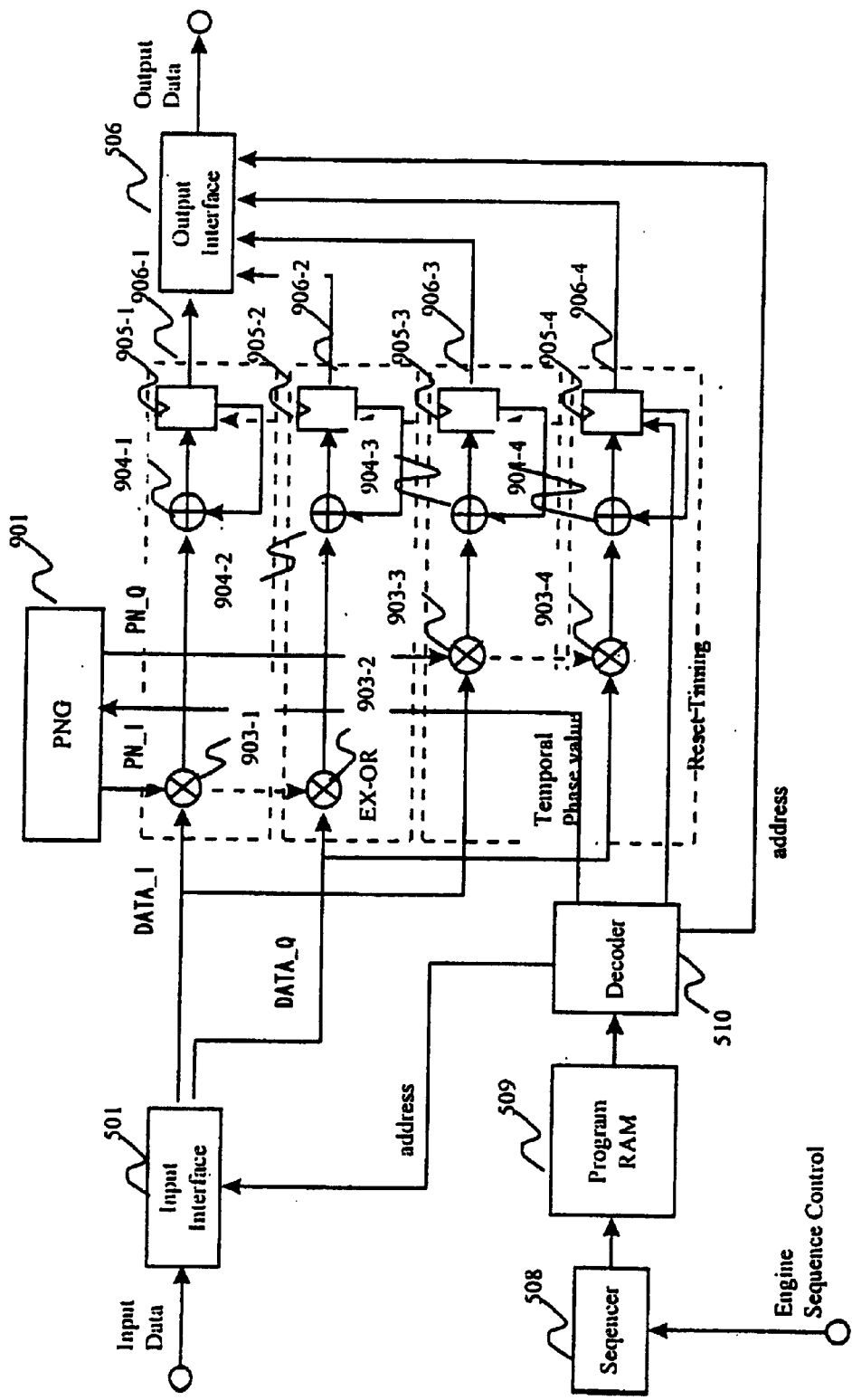
FIG. 7 shows a second configuration of the receiving system of a symbol-cycle processing engine in the third mode of implementation.

Further, a configuration in which partial hardware of the receiving unit is disposed in parallel to increase the processing speed is shown in FIG. 7. For instance, in a CDMA communication system performing QPSK spreading modulation, in order to accomplish phase compensation, correlation processing should be carried out in a overall combination between in-phase (I) components (DATA_I) and quadrature (Q) components (DATA_Q) of signals and I components (PN_I) and Q components (PN_Q) of spreading codes. It is possible to enhance the processing efficiency of slot-cycle processing engines at a later stage by providing pairs 906-1~4 of exclusive-OR processor 903 and adder 904, and a register 905 in parallel for each combination and having them perform correlation processing simultaneously.

Figure 8:
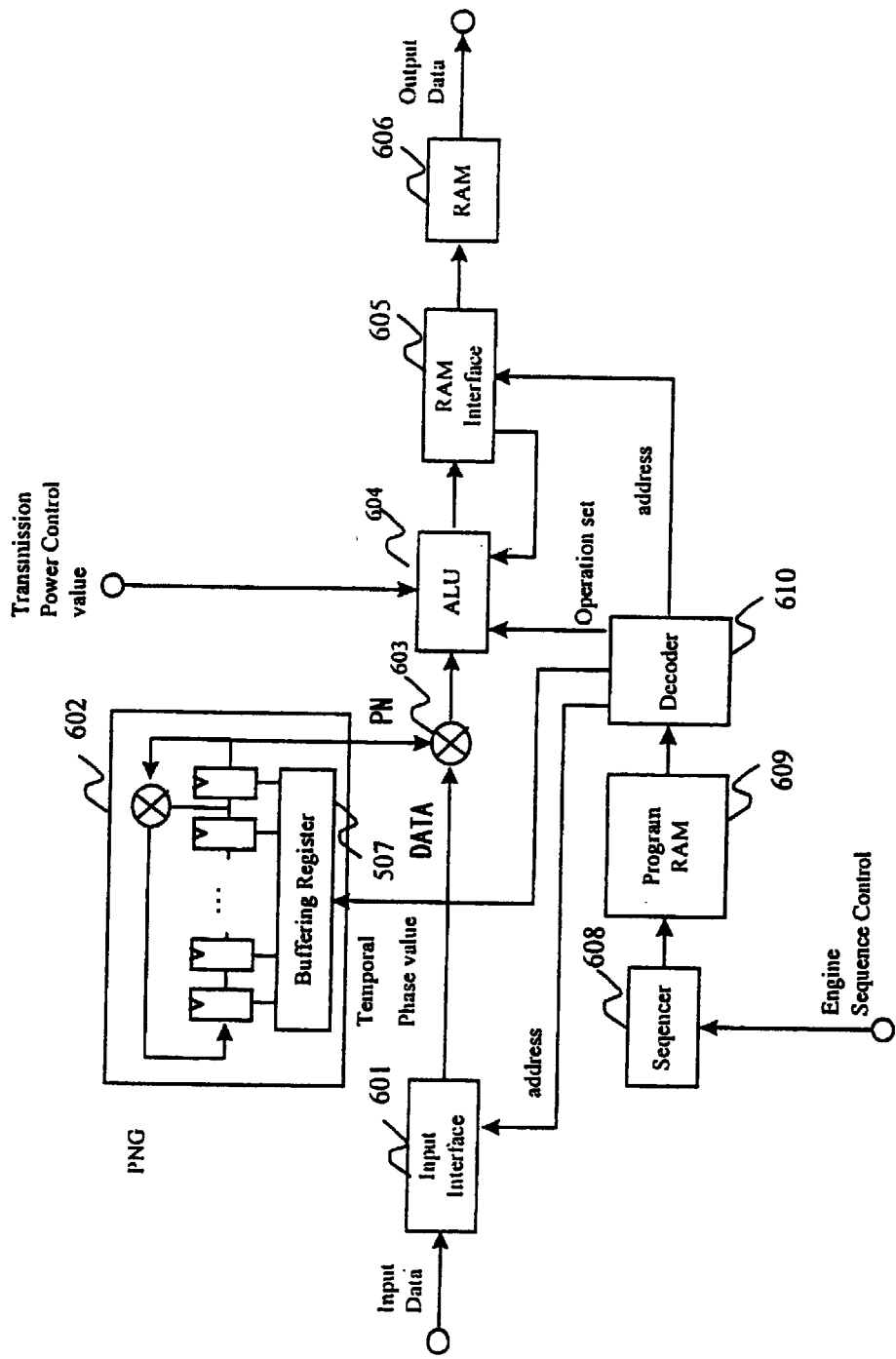
FIG. 8 shows a configuration of the transmitting system of the symbol-cycle processing engine in the third mode of implementation.

FIG. 8 illustrates the configuration of the transmitting (modulating) unit of the symbol-cycle processing engines 403. A symbol-cycle processing engine has processing elements including an exclusive-OR processor 603 and an adder 604, and performs demodulation processing with one symbol as its smallest processing unit. It reads in symbol-by-symbol data from the second buffer memory 404 via the input interface 601. The exclusive-OR processor 603 executes exclusive-OR processing with a spreading code generated by a PN (spreading code) generator 602, and the adder/subtractor 604 provides a transmission power value. The results of accumulation are written into a memory 606 via a memory interface 605.

In order to multiplex the transmitted signals on all the transmission channels, transmitted signals sent at the same timing are accumulated. For this purpose, transmitted signals to be sent at the same timing are read out of the memory 606 via the memory interface 605, and are added by the adder/subtractor 604 to spread data (output of the processor 603). The results of addition are again written into the memory 606 via the memory interface 605.

An operational command to the transmitting unit of a symbol-cycle processing engine is given as a sequencer 608 reads a control command out of a program memory 609 and a decoder 610 decodes that command. Like the receiving unit, the transmitting unit is flexible with respect to channels for processing by the program responsive to a plurality of channels.

As the transmitting unit of the symbol-cycle processing engine also processes signals of the chip rate, it is subject to a heavy processing load. Therefore it is desirable for the purpose of enhancing the overall hardware efficiency to provide a plurality of transmitting units and have them perform processing in parallel.

(2) Slot-cycle Processing Engines 405

Figure 9:
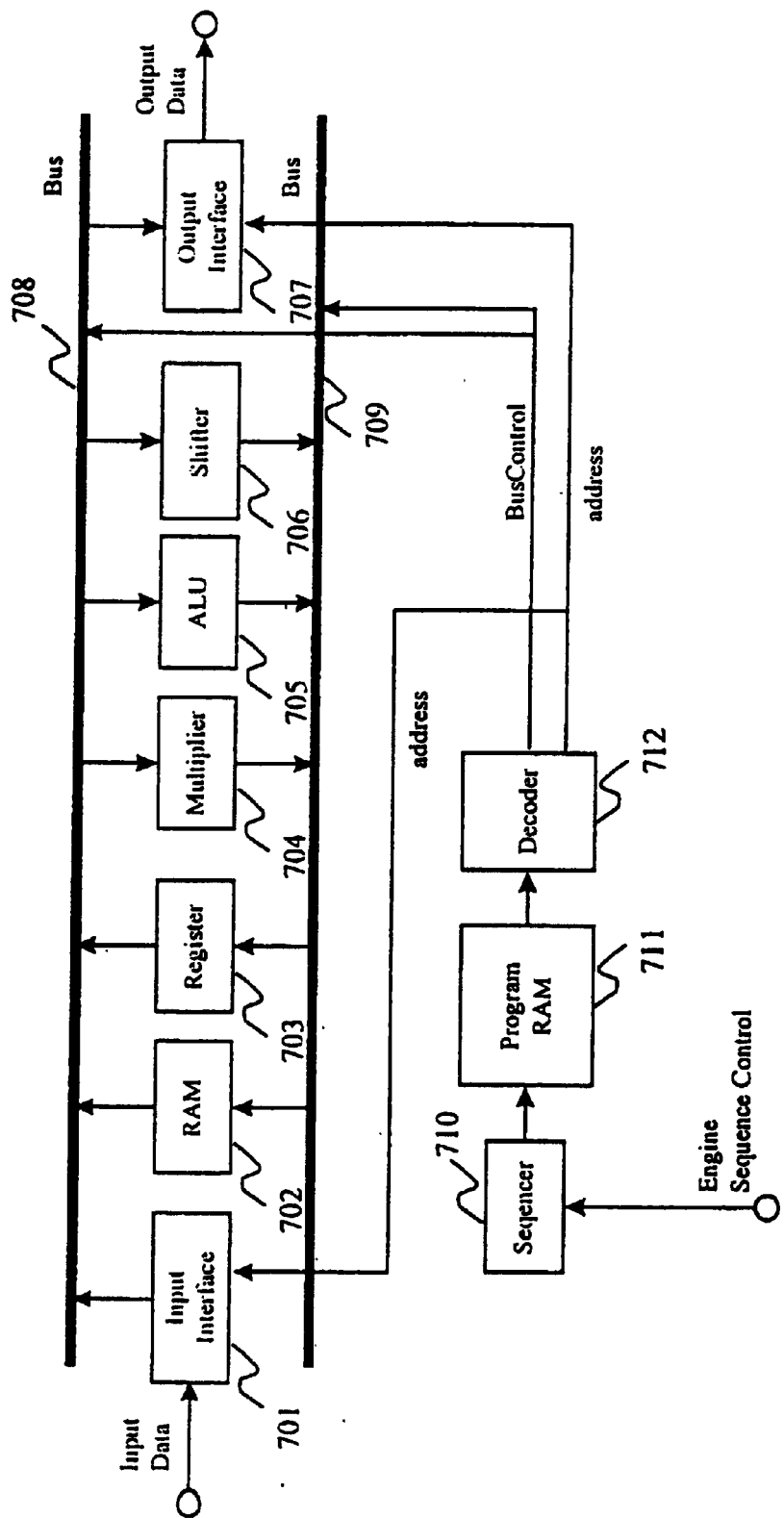
FIG. 9 shows a configuration of a slot-cycle processing engine in the third mode of implementation.

FIG. 9 illustrates the configuration of the slot-cycle processing engines 405. The slot-cycle processing engines constitute a block to process data of the symbol rate. Items of processing by the slot-cycle processing engines include the creation of a transmission format as modulation processing, and, as demodulation processing, detection of the peak timing, demodulation and rake combination.

The objects of processing by the slot-cycle processing engines include, as shown in FIG. 11, a plurality of types of symbols such as a received data symbol 1101, a pilot symbol 1102, a rate determination symbol 1103 and a power control symbol 1104, and the processing needs to differ with the type of symbol.

However, all these types of processing consist of combinations of multiplication and addition/subtraction. Therefore, a configuration is adopted in which basic processors (a multiplier 704, an adder/subtractor 705 and a shift processor 706 for shifting), a memory 702 for storing the results of calculation and a register 703 with buses 708 and 709 and input/output interfaces 701 and 707 are added to them. The combinations of operation for each processing are stated in advance in a program memory 711; a sequencer 710 gives the address of the program corresponding to each processing to the program memory 711, and the program that has been read out is decoded by a decoder 510. A decoded control signal controls the input/output interfaces 701 and 707 and the buses 708 and 709. A typical specific example of slot-cycle processing is taken up below.

(A) Processing on Pilot Symbols (Detection of Phase Rotation)

A plurality of pilot symbols are added in phase by the adder/subtractor 705, and information on amplitude and phase on the propagation path is calculated.

First, the decoder 712 designates an address where the pilot symbols for the input interface 701 is stored, and instructs the bus 708 to send data from the input interface 701 to the adder/subtractor 705. This causes the pilot symbols to be sent from the input interface 701 to the adder/subtractor 705. The adder/subtractor 705 processes addition, and the pilot symbols are thereby added.

Next, the decoder 712 instructs the bus 709 to send data from the adder/subtractor 705 to the register 703. The results of addition are thereby sent to the register 703.

Then, a program to add values stored in the register 703 and pilot symbols from the input interface 701 is sent from the program memory 711 to the decoder 712. The decoder 712 controls the input interface 701 and the bus 708 to send the pilot symbols and the values stored in the register 703 to the adder/subtractor 705. This sequence of processing is repeated until the addition of a required number of pilot symbols is completed, the results of addition are stored in the memory 702.

(B) Processing on Data Symbols (Demodulation and Rake Combination)

The phase that has rotated on the propagation path is corrected by the multiplier on the basis of phase information on the propagation path based on the pilot symbols. More specifically, the data symbols are multiplied by the average of the pilot symbols (demodulation). Both the data symbols and the pilot symbols have both in-phase components and quadrature components, this processing is to multiply complex numbers, and four multiplications and two addition/subtractions are executed using the multiplier 704 and the adder/subtractor 705.

First, the in-phase component (I) of a data symbol is sent from the input interface 701 to the multiplier 704, the in-phase component (X) of a pilot symbol is sent from the memory 702 to the multiplier 704, and the result of multiplication (I×X) is held by the register 703. As the result of multiplication involves a greater number of bits than the original data, only the required bits are taken out by shift processing. Then the result of multiplication stored in the register 703 is sent to the shift processor 706, and the result of processing is again stored in the register 703.

Similarly, the quadrature component (Q) of the data symbol and the quadrature component (Y) of the pilot symbol are multiplied, and the result of multiplication (Q×Y) is held by the register 703. From the register 703, (I×X) and (Q×Y) are sent to the adder/subtractor 705, and the adder/subtractor 705 subtracts the result of multiplication of the quadrature component (Q×Y) from the result of multiplication of the in-phase components (I×X). (I×X—Q×Y) is the in-phase component of the data symbol after demodulation, and stored in the memory 702.

Similarly, the quadrature component after demodulation is obtained as (I×X+Q×Y)

The only processing required for rake combination is addition, which is performed by the adder/subtractor 705. It is accomplished by sending the results of demodulation stored in the memory 702 to the adder/subtractor 705 in succession. The result of rake combination is sent from the output interface 707 in a slot cycle.

(C) Procession on Power Control Symbols

Similarly to data symbols, demodulation and rake combination are executed on power control symbols as well, though it is necessary to shorten the average time of pilot symbols used for demodulation and rake combination because power control symbols permit less processing delays than data symbols do.

Therefore, though the processing method is similar, demodulation is accomplished using only the phase information calculated from the pilot symbol immediately before power control symbols under processing.

Typical types of processing executed by the slot-cycle processing engines have been described so far. There also are other types of processing, including the measurement of reception power and that of noise power. These types of processing are executed as the sequencer 710 alters the address it designates for the program memory 711 to cause the matching program to be read out of the program memory 711, and the decoder 712 decodes it to control so that the data be sent to the required processor.

In this way, the slot-cycle processing engines 405, using basic processors, control a plurality of types of processing with a program. This enables the same hardware to execute a plurality of types of processing, and to help reduce the hardware gate size. Further, by storing input/output data for the slot-cycle processing engines in the buffer memories 404 and 406 and carrying out steps of processing on a plurality of channels or a plurality of fingers, or at different symbol rates on the same channel by time division multiplexing, the efficiency of hardware utilization can be enhanced.

(3) Frame-cycle Processing Engines 407

Figure 10:
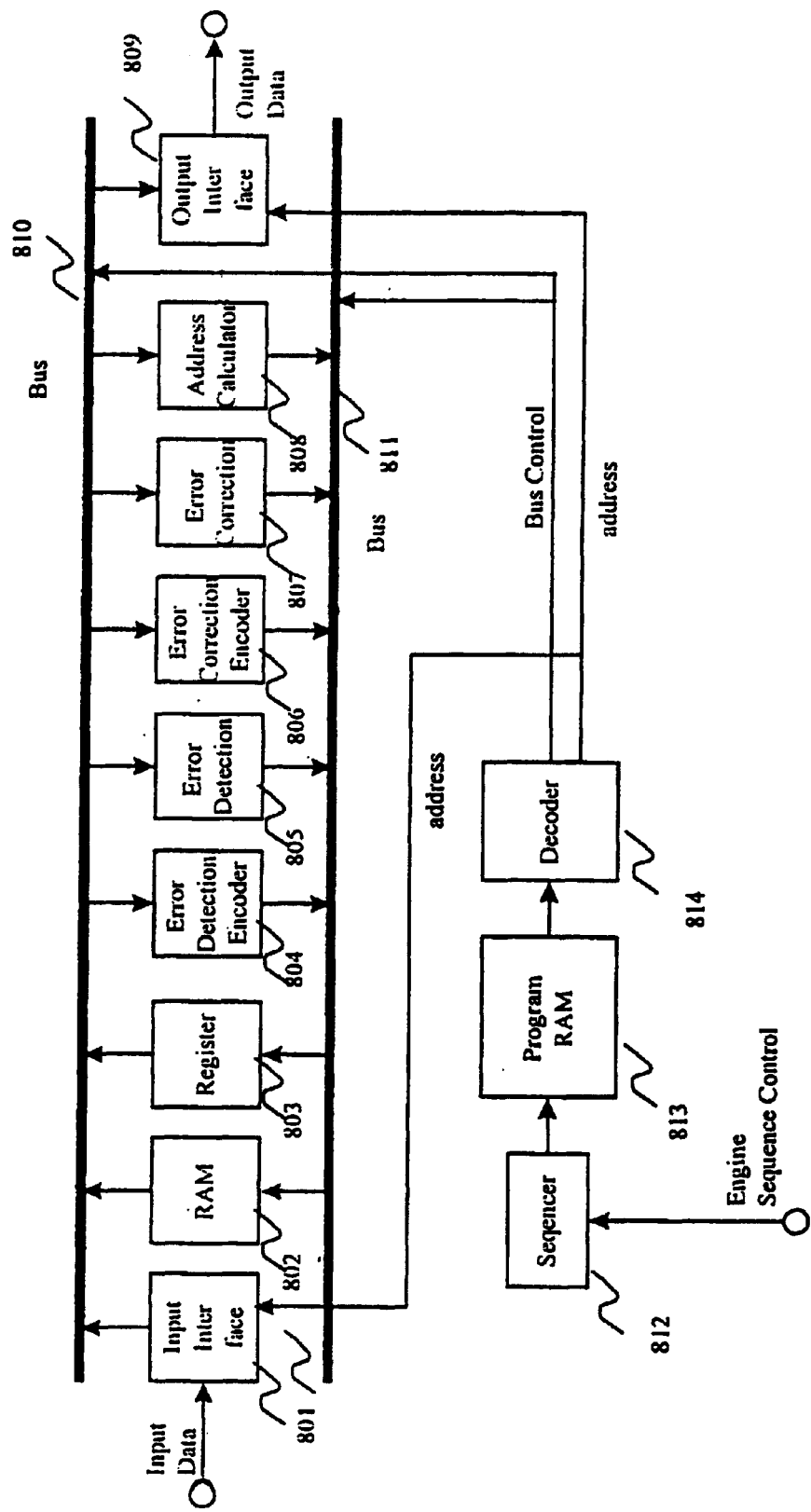
FIG. 10 shows a configuration of a frame-cycle processing engine in the third mode of implementation.

FIG. 10 illustrates the configuration of the frame-cycle processing engines 407. The frame-cycle processing engines constitute a block to process data in a frame cycle or a longer cycle. Types of frame-cycle processing include error detection encoding and decoding, error correction encoding and decoding, and interleaving. The constituent elements of the engines include an error detection (correction) encoder 804 (806), an error detection (correction) decoder 805 (807), an address calculator 808 for interleaving, a memory 802 for storing the results of processing and a register 803, which are connected by buses 810 and 811, and input/output interfaces 801 and 809 are added to them.

Data contained in a frame include control data between the base station and mobile stations in addition to user data.

Control data and user data generally differ in communication speed (the number of data contained in one frame) and in the capabilities of error correction/detection codes. The user data speed also differ in communication speed (the number of data contained in one frame) and in error correction/detection capabilities from application to application. Thus frame-cycle processing has to be responsive to a plurality of communication speeds and modes of encoding/decoding.

The combinations of operation for each of these processing are stated in advance in a program memory 813, and a sequencer 812 gives the address of a program corresponding to each processing to the program memory 813, and the program that has been read out is decoded by a decoder 814. The input/output interfaces 801 and 809 and the buses 810 and 811 are controlled with the decoded control signal.

Reception processing: Transmitted data inputted from the input interface 801 are successively sent to the error detection encoder 804. The encoded data are then encoded by the error correction encoder 806. The data having gone through error correction encoding are interleaved by being stored in a memory 802 corresponding to an address calculated by the address calculator 808.

Transmission processing: An address for de-interleaving is calculated by the address calculator 808, and received data are stored in a memory 802 corresponding to that address. The de-interleaved data undergo error correction by the error correction decoder 807, and error detection by the error detection encoder 805.

By connecting basic processors such as ones illustrated in FIG. 8 with buses, the plurality of types of processing in the frame-cycle processing engines can be accomplished in any desired combination, so that the same hardware can be used on channels different in speed and/or encoding method. Further, by holding input/output data in the memories 802, processing on a plurality of channels can be accomplished by time division multiplexing, and the required hardware gate size can be thereby reduced.

The hardware gate size can be reduced by dividing modulation/demodulation in the baseband block into processing units and having each of the divided units perform processing on a plurality of channels by time division multiplexing.

The efficiency of hardware use can be enhanced even more by further dividing each processor into processing elements, which constitute the smallest processing units, and using these processing units by time division multiplexing.

The present invention makes it possible to reduce the hardware of the baseband blocks of the base station and mobile stations of a radio communication system.

What is claimed is:

1. A communication apparatus to perform communication by a frame unit which comprises a plurality of slots, each of the slots comprising a plurality of symbols, provided with at least a first processing block for performing symbol-cycle modulation/demodulation processing, a second processing block for performing slot-cycle modulation/demodulation processing, and a buffer memory for storing signals to be outputted from said first processing block and inputted to said second processing block or signals to be outputted from said second processing block and inputted to said first processing block.

2. A communication apparatus, as stated in claim 1, further comprising a third processing block for performing frame-cycle modulation/demodulation processing.

3. A communication apparatus, as stated in claim 2, wherein the capacity of said buffer memory between said first processing block and said second processing block is kept to the minimum volume required for modulation/demodulation processing on a plurality of channels by said second processing block.

4. A communication apparatus, as stated in claim 1, wherein each processing block is configured of the minimum required basic processing elements, and processing is accomplished by combining those elements with a sequencer.

5. A communication apparatus, as stated in claim 1, wherein said communication apparatus is to be applied to a CDMA communication system performing QPSK spreading modulation, and said first processing block has a configuration wherein four pairs, each of an exclusive-OR processor and an adder (or an adder/subtractor), are disposed in parallel to perform correlation of four combinations between the in-phase and quadrature components of received signals and the in-phase and quadrature components of spreading codes.

6. A communication apparatus, as stated in claim 1, wherein said communication apparatus is to be applied to a CDMA communication system differing in symbol cycle from channel to channel, and said first processing block has its processing unit conforming to one symbol length of the channel having the longest symbol cycle.

7. A communication apparatus, as stated in claim 1, wherein said first block has a plurality of symbol-cycle processing engines provided in parallel.

* * * * *

UNITED STATES PATENT AND TRADEMARK OFFICE
CERTIFICATE OF CORRECTION

PATENT NO. : 7,088,696 B1 Page 1 of 1
APPLICATION NO. : 09/427595
DATED : August 8, 2006
INVENTOR(S) : M. Kawabe et al.

It is certified that error appears in the above-identified patent and that said Letters Patent is hereby corrected as shown below:

ON THE TITLE PAGE

Please insert (73) to read as follows:

(73) Assignee: Hitachi, Ltd., Tokyo (JP)

Signed and Sealed this

Twenty-second Day of May, 2007

JON W. DUDAS
*Director of the United States Patent and Trademark Office*